United States Patent [19]
MacDonald et al.

[11] Patent Number: 5,896,122
[45] Date of Patent: Apr. 20, 1999

[54] COLOR IMAGE PROCESSING

[75] Inventors: Lindsay W. MacDonald, Bedfordshire; Clive L. Mayne, London, both of United Kingdom

[73] Assignee: Fujifilm Electronic Imaging Limited, London, United Kingdom

[21] Appl. No.: 07/824,214

[22] Filed: Jan. 22, 1992

[30] Foreign Application Priority Data

Jan. 23, 1991 [GB] United Kingdom .................. 9101493

[51] Int. Cl.$^6$ .................................................. G09G 5/04
[52] U.S. Cl. ................................... 345/153; 345/154
[58] Field of Search ........................... 340/701, 703; 358/75, 80; 345/199, 153, 154, 155

[56] References Cited

U.S. PATENT DOCUMENTS

| | | | |
|---|---|---|---|
| 4,500,919 | 2/1985 | Schreiber | 358/80 |
| 4,901,258 | 2/1990 | Akiyama . | |
| 4,975,861 | 12/1990 | Fujimoto . | |
| 5,068,644 | 11/1991 | Batson et al. | 340/701 |
| 5,164,711 | 11/1992 | Tuel, Jr. | 340/701 |

FOREIGN PATENT DOCUMENTS

| | | |
|---|---|---|
| 0159691 | 10/1985 | European Pat. Off. . |
| 3222662 | 1/1983 | Germany . |
| 1369702 | 10/1974 | United Kingdom . |
| 2104337 | 3/1983 | United Kingdom . |

*Primary Examiner*—Amare Mengistu
*Attorney, Agent, or Firm*—Sughrue, Mion, Zinn, Macpeak & Seas, PLLC

[57] ABSTRACT

Apparatus for performing a color transformation or color retouch operation on multibit digital data defining P color components of image pixels. The apparatus comprises a look-up table (2) which is addressed by N most significant bits (MSBS) of each color component value and which contains coarse versions of output pixel color component values. An interpolator (3) is responsive to M least significant bits (LSBS) of each color component value to interpolate fine versions of the output pixel values from the coarse output pixel values obtained from the look-up table. A processor loads coarse output pixel data for each color component into the $2_{NP}$ addresses of the look-up table which may be addressed by the M MSBs of the input pixel data. The processor (8) is adapted to cause the value of N progressively to increase with successive iterations.

10 Claims, 2 Drawing Sheets

COLOR IMAGE PROCESSING

FIELD OF THE INVENTION

The invention relates to methods and apparatus for performing a colour transformation or colour retouch operation on multibit digital data defining colour components of image pixels.

DESCRIPTION OF THE PRIOR ART

In colour reproduction and colour image processing equipment, such as electronic scanners, video displays and picture communication systems, colour images are conventionally represented as a raster array of picture elements ("pixels"). Each pixel typically consists of three or four digital values corresponding to the respective quantities of the primary colour components. Common colour coordinate systems are: red, green and blue (RGB) for the phosphors of a cathode ray tube monitor; cyan, yellow, magenta and black (CMYK) for the inks in a printing process; tristimulus values (XYZ) for the CIE system of colorimetry; and lightness, colourfulness and hue (LCH) for the perceptual attributes of a device-independent application.

Because of the differing colour coordinates of devices within a complex system it is essential to be able to transform from one colour coordinate system to another. A graphic arts application, for example, may scan a photographic transparency to generate image data in RGB filter densities; these might then be converted to XYZ or one of its derivatives such as CIELUV or CIELAB for storage on magnetic disk or transmission to another site; the data will then be converted to RGB monitor drive signals for display and to CMYK ink densities for final printing. As a high quality A4-size colour image scanned at a resolution of 12-16 points per millimetre may easily generate 40 million bytes of data, it is necessary to perform the transformations between different colour coordinate systems as efficiently as possible.

The requirements of the operator interface to a computer display place particular demands on the computer's colour processing ability. Firstly, the human visual system perceives colour in terms of its lightness, colourfulness and hue (LCH) and these are the coordinates that are best used by the operator for the manipulation of image colour. Unfortunately, the LCH coordinates are complex non-linear functions of XYZ and must also take into account the display viewing conditions and any disparity in colour gamut between the display and originating/printing devices, as described in U.S. patent application Ser. No. 07/665123. Second, for optimum interaction the delay between the operator's action and the display's response should be minimised.

The performance objective of any interactive image modification system is to allow the operator to achieve the desired modification to the displayed image without perceptible delay. Frequently the operator will be required to adjust a control device, generating a succession of modified images on the display screen until the desired degree of modification is achieved. (An example is the adjustment of colour balance in the mid-tones of an image.) Psychological experiments have shown that delays of more than about 150 milliseconds between successive modifications of the displayed image will lead to a significant reduction in the cognitive efficiency of the operator.

The processing power necessary to perform the colour transformations at interactive display speeds can be estimated as follows. Suppose that the displayed image has 1,000 lines of 1,000 pixels each, one million pixels in all, and is updated six times per second. Each pixel will therefore need to be processed in about 160 nanoseconds. Assume that the image has previously been converted into LCH colour coordinates, and that at each step it is to be modified in LCH and then converted to RGB for display. The LCH modification will generally be simple and possible to implement in only a few computer instructions. The conversion from LCH to RGB, however, is very complex and typically requires about 100 floating point operations to implement. Thus a processor would need to be capable of at least 600 million floating point operations per second to achieve the required response time. In practice, such power is beyond all but the largest supercomputers and parallel processing arrays in the current state of the art, and would be prohibitively expensive.

Known solutions to this type of problem are to use dedicated hardware and to use look-up tables. Dedicated hardware, designed to implement the specified transformation function at the necessary speed, has the disadvantages of being expensive to develop and construct and also inflexible because it cannot easily be modified to perform a different function. Look-up tables, on the other hand, can be implemented simply by using sufficient memory, can be constructed in either hardware or software, and are easily reprogrammed for other functions. They are arranged so that each combination of input values addresses one unique location in the table, which contains the precomputed output value of the function. Look-up tables are widely used for colour transformations in computer graphics and image processing, as described in "Fundamentals of Interactive Computer Graphics", by J. D. Foley and A. Van Dam, published Addison-Wesley 1982.

For high-quality images, however, even the simple look-up table method can be too expensive to implement in a practical display system. To achieve acceptable image quality, each of the colour components of the image is generally quantised to 256 levels, represented digitally by eight bits. For three-colour systems, such as RGB and XYZ, there are thus 24 bits per pixel, giving rise to $2^{24}$ possible combinations. A look-up table must therefore provide $2^{24}=$ 16 Million addressable locations, each of which contains 24 bits (three bytes) of output data. Although it is possible with modern memory technology to build such a look-up table, the cost of 48 Megabytes of random access memory is substantial. For four-colour systems, such as CMYK, there are 32 bits per pixel giving $2^{32}=4$ Billion possible combinations and it is not feasible to build a look-up table of this size.

A solution to this problem is given in U.S. Pat. No. 3,893,166, which corresponds to British Patent Specification No. 1,369,702, wherein the LUT is computed only from the four most significant bits of each colour component, giving $2^{12}=4096$ combinations. During high speed processing, the four most significant bits are used to address this "coarse" LUT, while the four least significant bits are used to interpolate values between neighboring points of the table.

Although the known interpolation techniques give satisfactory image quality, they are not suitable for interactive operation. Thus, before an interpolation process can be carried out, the LUT has to be loaded with all the data that may be needed, in other words an output value must be loaded at each possible address of the LUT. The computation of the output data and subsequent loading of the data into the LUT is time consuming and there is a need to achieve a much faster retouch or transformation operation so that truly interactive image processing can be achieved. At present, the operator would need to wait for a number of seconds before the result of his image modification command appeared on the monitor screen.

The situation is even worse for the corresponding look-up and interpolation technique applied to a system with four colour coordinates. Assuming that the four most significant bits of each component were used to address the LUT, it would need to have $2^{15}=65,536$ locations, each containing 4 bytes. The LUT memory size would therefore be 256 kilobytes, compared with only 12 Kilobytes for the three-colour system, increasing the computational set-up time by a factor of more than 20.

SUMMARY OF THE INVENTION

In accordance with one aspect of the present invention, a method of performing a colour transformation or colour retouch operation on multibit digital data defining P colour components of image pixels in which N most significant bits (MSBs) of each colour component value address a look-up table (LUT) containing coarse versions of output pixel colour component values, and M least significant bits (LSBs) of each colour component value are used to interpolate fine versions of the output pixel values from the coarse output pixel values, and wherein in a first step, for each colour the $2^{NP}$ addresses of the LUT are loaded with appropriate coarse output pixel values, and in a second step the input pixel data addresses the LUT to obtain coarse output pixel data which is subsequently interpolated, is characterised in that the first and second steps are repeated with increasing values of N.

In accordance with the second aspect of the present invention, apparatus for performing a colour transformation or colour retouch operation on multibit digital data defining P colour components of image pixels, the apparatus comprising a look-up table which is addressed by N most significant bits (MSBs) of each colour component value and which contains coarse versions of output pixel colour component values; interpolation means responsive to M least significant bits (LSBs) of each colour component value to interpolate fine versions of the output pixel values from the coarse output pixel values obtained from the look-up table; and control means for loading coarse output pixel data for each colour component into the $2^{NP}$ addresses of the look-up table which may be addressed by the N MSBs of the input pixel data, characterised in that the control means is adapted to cause the value of N progressively to increase with successive iterations.

The present invention enables the desired performance objective of 150 msec update time to be met with the use of a relatively modest image processor by operating initially with only the minimum number of the MSBs of each colour component used to address the LUT, subsequently refining the modification when time allows by repeating the operation with additional MSBs. The invention trades off image detail against update time, making use of the results of recent psychophysiological research into the human visual system ("Discrimination of sharpness in a televised moving image", W E & K G Glenn, Displays, October 1985, pp.202–6).

The intention is that as the operator makes rapid interactive adjustments to the colour transform, the displayed image will be modified quickly to give an approximation to the true colour. As the operator's adjustment rate drops, the image will be modified to an intermediate level of colour fidelity. When the adjustment ceases, the modification will be completed at a high colour fidelity for critical evaluation by the operator.

The invention has recognised that it is possible to relax the previous requirement that the entire multibit value corresponding to a particular pixel colour component had to be used for performing the colour transformation or colour retouch operation. Furthermore, the invention recognises that over a relatively short period of time (less than about 150 milliseconds) an operator cannot perceive the relative coarseness or inaccuracies in the output colours due to the reduced number of MSBs which are used initially.

Typically P would be 3 or 4, corresponding to an image processing system dealing with images consisting of three or four colour components. It is envisaged that in a general colour transformation or colour retouch operation, N will be set to a relatively low number initially, for example 2, enabling the look-up table to be loaded very quickly in response to the definition of a transformation or retouch algorithm by the operator. This enables a coarse representation of the image to be displayed on the colour monitor screen very quickly following which the value of N is increased, usually by one integer at a time, with the result that the image displayed on a monitor screen gradually conforms more and more closely to the algorithm specified by the operator.

Typically, the value of M will remain constant throughout the operation for example M=4 although in some circumstances this could vary also.

The invention can be used for retouching the colours in an image so that the output colour components correspond to the input colour components, for example RGB in and RGB out, or for a colour transformation operation in which the output colour components differ from the input colour components, for example CMYK in and RGB out.

Typically, N will continue to be incremented until all digits in the multibit digital data are used either in the N bits or the M bits. However, the method can be terminated early where the operator perceives quickly that the operation instructed is not suitable with the result that N may never reach its highest possible value.

BRIEF DESCRIPTION OF THE DRAWINGS

An example of a method and apparatus according to the present invention will now be described with reference to the accompanying drawings, in which.

DETAILED DESCRIPTION OF THE EMBODIMENT

The invention will be described in connection with transforming original image pixels in CMYK colour space to modified image pixels also in CMYK colour space but after the application of a retouching operation to generate pixel values C', M', Y', K'. However, the invention is equally applicable more generally to the transformation from one colour space to another.

Figure 1:
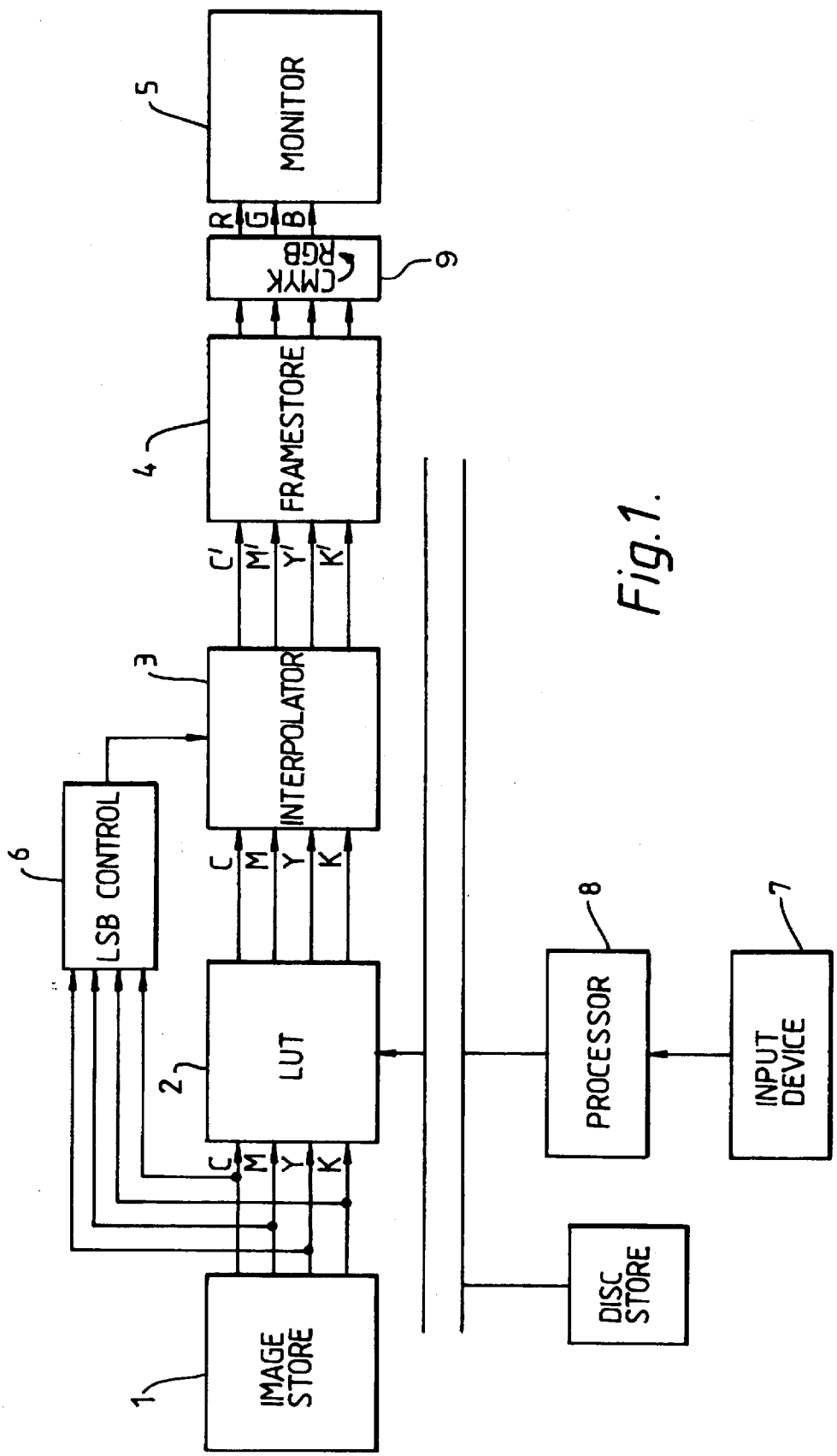
FIG. 1 is a block diagram of the apparatus.

The apparatus shown in FIG. 1 comprises an image store (1) which contains digital data defining the colour component content of the pixels of an image. In this example, each pixel is represented by four colour component values representing the cyan, magenta, yellow and black components respectively, each value being defined by eight bit digital data. This will have been generated by scanning an original transparency, for example, using the Crosfield Magnascan input scanner, generating RGB signals which are converted to CMYK, or by originating the image electronically.

The image store (1) is connected to a look-up table (2) which is addressed by the pixel value stored in the image store (1) as will be described in more detail below. The output of the LUT (2) is fed to an interpolator (3) which generates final output colour data for each pixel C', M', Y', K' which is stored in a frame store (4). The image stored in the frame store (4) is converted from CMYK to RGB via a colour converter (9) and is then displayed on a monitor (5). The interpolator (3) is controlled via a least significant bit (LSB) control (6) which operates in accordance with the ranking order of the LSBs to provide weighting values to the interpolator 3.

An operator controls operation of the apparatus via an input device (7), such as a keyboard or mouse, and a processor (8) running application software that couples the input device to the LUT (2).

Figure 2:
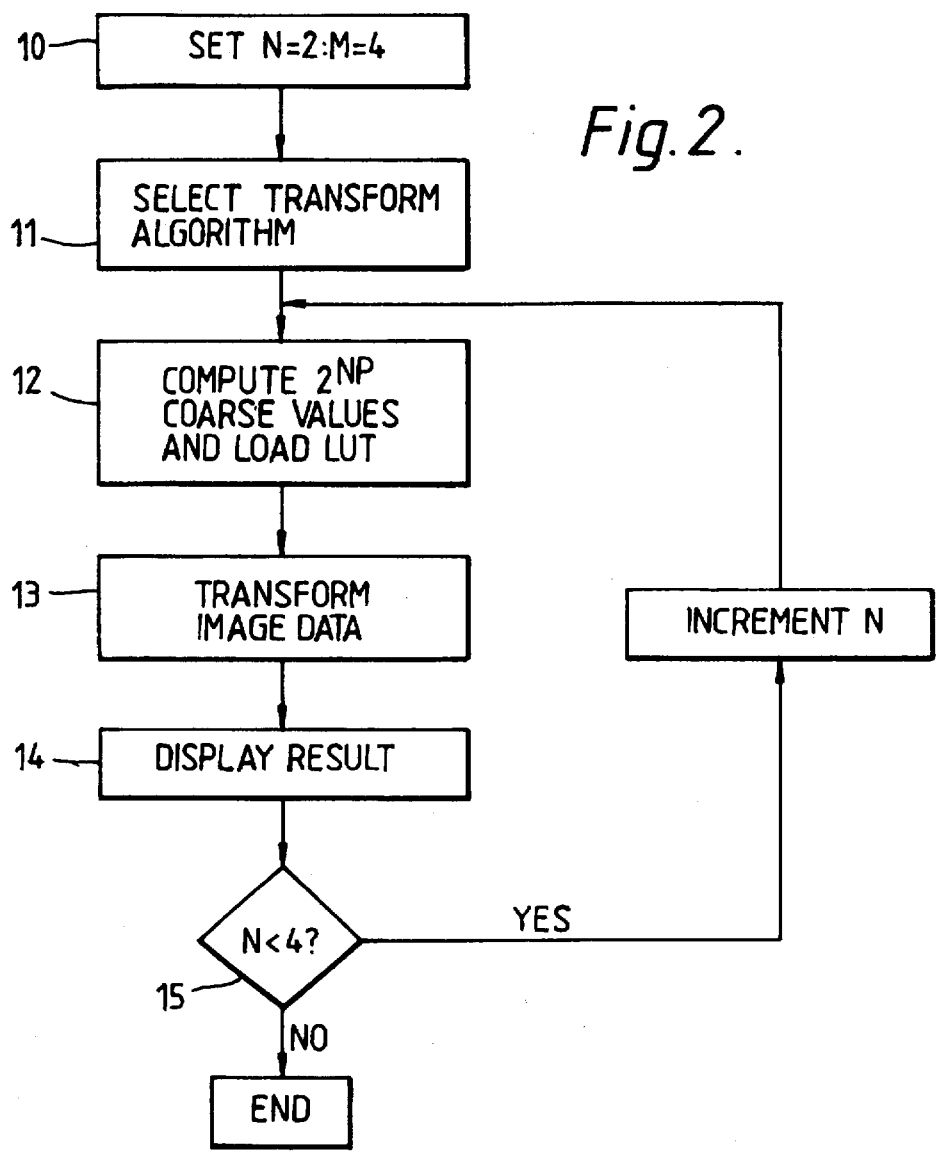
FIG. 2 is a flow diagram illustrating operation of the method.
Figure 3:
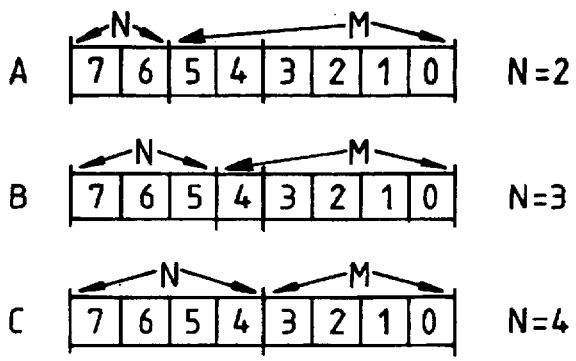
FIG. 3 is a diagram showing the MSB:LSB data fields.

The operation of the apparatus in FIG. 1 will now be described with reference to FIG. 2. At the commencement of a transformation or retouching process, the processor (8) sets values for N=2 and M=4 (step 10). The N and M bits used in this first iteration are shown in FIG. 3A. The operator then selects via the input device (7) a colour transformation algorithm which may be of any conventional type (step 11).

As indicated above, initially the value of N is set to 2. This value represents the number of most significant bits in each colour component value CMYK which is used to address the LUT (2) in a first pass. Clearly, where N is 2 a maximum of $2^{2(4)}=256$ input values per colour component are sufficient to address the LUT (2). The processor (8) responds to the instruction from the input device (7) to calculate the output "coarse" values $R_c$, $G_c$, $B_c$, corresponding to the four possible input addresses for each colour component. A total of $2^8=256$ values must be calculated. These are loaded into appropriate locations in the LUT (2) (step 12).

Once the LUT (2) has been loaded, data from the image store (1) is fed to the LUT (2). The LUT (2) responds to the first N bits in the incoming values which address respective locations in the LUT to obtain as output values the previously stored data $R_c$, $G_c$, $B_c$, which (coarse) values are fed to the interpolator (3). The interpolator (3) is controlled via the LSB control (6) which responds to the ranking of the M least significant bits in each colour component value to control the interpolator (3) which finally generates transformed colour components R', G', B' (step 13). Typically, this interpolation process is as described in more detail in GB-A-1369702 the disclosure of which is incorporated herein by reference.

The data values from the interpolator (3) are stored in the frame store (4) so that the result can be seen on the monitor (5) by the operator (step 14).

As soon as the image data has been transformed and while it is being displayed, the processor (8) checks to see whether N is less than 4 (step 15) and if it is then increments N by one and repeats steps 12-14 with the new value of N (FIGS. 3B and 3C). This repeat will involve the computation and loading of a larger number of addresses in the LUT (2) which will subsequently be addressed by a greater variety of address values. When N=4 the $2^{4(4)}=64K$ values must be computed. However, although the subsequent computation will take longer than the first, while it is taking place the operator is viewing the result of the first computation. As soon as the second computation is completed, the monitor (5) will display the result of the second computation which will effectively be a "finer" version approximating more closely to the algorithm specified by the operator.

At any stage, the operator can terminate the procedure if, for example, he is dissatisfied with the result and this obviates the need for the full set of computations for N=4 to be calculated. However, if the operator does nothing, steps 12-14 will be repeated until N=4 whereupon the process will terminate and the monitor will continue to display the most recently updated version of the image in the frame store (4).

We claim:

1. A method of performing a colour transformation or colour retouch operation on multibit digital data defining P colour components of image pixels in which N most significant bits (MSBs) of each colour component value address a look-up table (LUT) containing coarse versions of output pixel colour component values, and M least significant bits (LSBs) of each colour component value are used to interpolate fine versions of the output pixel values from the coarse output pixel values, wherein P, N, and M are integers and wherein in a first step, for each colour the $2^{NP}$ addresses of the LUT are loaded with appropriate coarse output pixel values, and in a second step the input pixel data addresses the LUT to obtain coarse output pixel data which is subsequently interpolated, and wherein the first and second steps are repeated with increasing values of N.

2. A method according to claim 1, wherein P is 3 or 4.

3. A method according to claim 1, wherein N is set initially to 2.

4. A method according to claim 1, wherein N is increased by one integer at a time.

5. A method according to claim 1, wherein the value of M remains constant.

6. A method according to claim 5, wherein M=4.

7. A method according to claim 1, further comprising displaying the interpolated pixel data on a monitor.

8. A method according to claim 7, wherein the first and second steps of the method are repeated while the results of a previous iteration of the method are displayed on the monitor.

9. Apparatus for performing a colour transformation or colour retouch operation on multibit digital data defining P colour components of image pixels, the apparatus comprising a look-up table which is addressed by N most significant bits (MSBs) of each colour component value and which contains coarse versions of output pixel colour component values; interpolation means responsive to M least significant bits (LSBs) of each colour component value to interpolate fine versions of the output pixel values from said coarse output pixel values obtained from said look-up table; and control means for loading coarse output pixel data for each colour component into the $2^{NP}$ addresses of said look-up table which may be addressed by the N MSBs of the input pixel data, wherein P, N, and M are integers and wherein said control means is adapted to cause the value of N progressively to increase with successive iterations.

10. Apparatus according to claim 9, further comprising a frame store coupled to the interpolation means for storing the colour component values output by the interpolation means; and a monitor connected to the frame store for displaying the pixels as defined in a frame store.

* * * * *